United States Patent
Choi et al.

(10) Patent No.: US 7,120,132 B2
(45) Date of Patent: Oct. 10, 2006

(54) APPARATUS AND METHOD FOR SYNCHRONIZATION OF UPLINK SYNCHRONOUS TRANSMISSION SCHEME IN A CDMA COMMUNICATION SYSTEM

(75) Inventors: Sung-Ho Choi, Songnam-shi (KR); Yong-Jun Kwak, Yongin-shi (KR); Kook-Heui Lee, Songnam-shi (KR); Hyun-Woo Lee, Suwon-shi (KR); Seong-Ill Park, Kunpo-shi (KR); Ho-Kyu Choi, Seoul (KR)

(73) Assignee: Samsung Electronics Co., Ltd., (KR)

( * ) Notice: Subject to any disclaimer, the term of this patent is extended or adjusted under 35 U.S.C. 154(b) by 839 days.

(21) Appl. No.: 09/888,914

(22) Filed: Jun. 25, 2001

(65) Prior Publication Data

US 2002/0009129 A1    Jan. 24, 2002

(30) Foreign Application Priority Data

Jun. 24, 2000   (KR)   ................................ 2000-35174
Jun. 29, 2000   (KR)   ................................ 2000-36666

(51) Int. Cl.
*H04B 7/216*   (2006.01)
*H04J 3/06*   (2006.01)

(52) U.S. Cl. ....................... 370/324; 370/342; 370/350; 455/502; 375/358

(58) Field of Classification Search ................ 370/342, 370/441, 479, 517, 519, 278, 324; 375/149, 375/145, 293, 358; 455/13.2, 423
See application file for complete search history.

(56) References Cited

U.S. PATENT DOCUMENTS

| | | | |
|---|---|---|---|
| 5,673,259 A | | 9/1997 | Quick, Jr. |
| 5,839,052 A | * | 11/1998 | Dean et al. .................. 725/106 |
| 5,850,392 A | | 12/1998 | Wang et al. |
| 5,930,244 A | * | 7/1999 | Ariyoshi et al. ............ 370/335 |
| 5,930,366 A | | 7/1999 | Jamal et al. |
| 6,721,299 B1 | * | 4/2004 | Song ........................... 370/342 |

OTHER PUBLICATIONS

Japanese Office Action dated Mar. 9, 2004 issued in a counterpart application, namely, Appln. No. 2002-505401.

(Continued)

*Primary Examiner*—Doris H. To
*Assistant Examiner*—Ian N. Moore
(74) *Attorney, Agent, or Firm*—Dilworth & Barrese LLP

(57) ABSTRACT

Disclosed is a method for synchronizing a scrambling code in a CDMA communication system including a UTRAN (UMTS Terrestrial Radio Access Network) and a plurality of user equipments (UEs), using orthogonal codes for identifying the UEs and a single scrambling code for identifying the UTRAN by the UEs, and employing an uplink synchronous transmission scheme (USTS) where the UEs synchronize frames of uplink dedicated physical channels (DPCHs) using the single scrambling code. The UEs receive a reference signal including reference time information provided from the UTRAN and transmit a random access channel (RACH) based on the reference time. The UTRAN receives the random access channels from the UEs to measure a propagation delay time (PD) of each random access channel signal from the UEs, and transmits a transmission time adjustment value calculated using the measured propagation delay time and a time offset $\tau_{DPCH,n}$ between a transmission time point of the reference signal and a transmission time point of a downlink DPCH. Each UE determines a transmission time of the uplink DPCH by receiving the transmission time adjustment value, and scrambles a message with the orthogonal code and a scrambling code generated at the reference time, at the transmission time so determined as to transmit the message over the uplink DPCH.

24 Claims, 4 Drawing Sheets

OTHER PUBLICATIONS

SK Telecom: "Code Allocation and Timing Control for USTS", TSG-RAN Working Group 1 meeting #9, Germany, Nov. 30—Dec. 3, 1999.

SK Telecom: "Uplink Synchronous Transmission Scheme", TSG-RAN Working Group 1 meeting #7, Korea, Sep. 4-5, 1999.

3rd Generation Partnership Project; Technical Specification Group Radio Access Network; Physical Channels and Mapping of Transport Channels onto Physical Channels (FDD), Release 1999.

3rd Generation Partnership Project; Technical Specification Group Radio Access Network; Synchronisation in UTRAN Stage 2, Release 1999.

3rd Generation Partnership Project (3GPP); Technical Specification Group Radio Access Network Physical Layer Procedures (FDD) (3G TS 25.214 version 3.0.0), Oct. 1999.

3rd Generation Partnership Project; Technical Specification Group Radio Access Network; Study Report for Uplink Synchronous Transmission Scheme (USTS), Release 5, Mar. 2001.

SK Telecom: CRs to 25.211, 25.213, and 25.214 for Clean Up of USTS Related Specifications, Feb. 29—Mar. 3, 2000, pp. 1-30.

SK Telecom: Uplink Synchronous Transmission Scheme (USTS), TSG-RAN Working Group 1, Meeting #14, Finland, Jul. 4-7, 2000.

* cited by examiner

APPARATUS AND METHOD FOR SYNCHRONIZATION OF UPLINK SYNCHRONOUS TRANSMISSION SCHEME IN A CDMA COMMUNICATION SYSTEM

This application claims priority to an application entitled "Apparatus and Method for Synchronization of Uplink Synchronous Transmission Scheme in a CDMA Communication System" filed in the Korean Industrial Property Office on Jun. 24, 2000 and assigned Ser. No. 2000-35174, and an application entitled "Apparatus and Method for Synchronization of Uplink Synchronous Transmission Scheme in a CDMA Communication System" filed in the Korean Industrial Property Office on Jun. 29, 2000 and assigned Ser. No. 2000-36666, the contents of each of which are hereby incorporated by reference.

BACKGROUND OF THE INVENTION

1. Field of the Invention

The present invention relates generally to a channel communication apparatus and method in a CDMA communication system, and in particular, to an apparatus and method for assigning codes necessary for synchronization and channel separation using an uplink synchronous transmission scheme in a CDMA communication system.

2. Description of the Related Art

A CDMA (Code Division Multiple Access) system is divided into a synchronous system and an asynchronous system. Such a CDMA communication system uses orthogonal codes to separate channels. Herein, a description of the invention will be made with reference to an asynchronous W-CDMA (Wideband-CDMA) communication system, also known as a UMTS (Universal Mobile Telecommunications System) communication system. However, the invention can also be applied to a different CDMA system such as the CDMA-2000 system, as well as the W-CDMA system.

FIG. 1 illustrates architecture of a W-CDMA communication system. As illustrated, the W-CDMA communication system includes an RNC (Radio Network Controller) 101, a plurality of Node B's 103-1 to 103-3 (hereinafter, referred to as a "UTRAN" (UMTS Terrestrial Radio Access Network); a base station transceiver subsystem (BTS) in the CDMA-2000 system) connected to the RNC 101, and a user equipment (UE; a mobile station in the CDMA-2000 system) 105 connected to one of the UTRANs 103-1 to 103-3 through a radio interface. Every process for connection of the UE 105 is controlled by the RNC 101. Further, the RNC 101 manages assignment of channel resources to the UEs connected to the UTRANs.

When successfully connected to the UTRAN through the channel assigned by the RNC 101, the UE 105 maintains communication using the assigned downlink or uplink dedicated physical channel (DPCH). The W-CDMA communication system uses the asynchronous channels, which are not synchronized with one another. In this case, the UTRAN 103 assigns a unique scrambling code to the UE 105 in order to distinguish one UE 105 from another UE.

The scrambling code is classified into a long scrambling code and a short scrambling code. In the following description, the "scrambling code" will refer to the long scrambling code.

The scrambling code is created in the following process of:

(Step 1) receiving 24 initial values n0,n1, . . . ,n23,
(Step 2) creating sequences $x(i)$ and $y(i)$, where $i=0, \ldots, 2^{25}-27$,
$x(0)=n0, x(1)=n1, x(2)=n2, \ldots, x(23)=n23, x(24)=1$
$x(i+25)=x(i+3)+x(i)$ modulo 2, $i=0, \ldots, 2^{25}-27$
$y(0)=y(1)=y(2)= \ldots =y(23)=y(24)=1$
$y(i+25)=y(i+3)+y(i+2)+y(i+2)+y(i)$ modulo 2, $i=0, \ldots, 2^{25}-27$ (Step 3) creating a sequence $z(i)$, where $i=0, \ldots, 2^{25}-2$,
$z(i)=x(i)+y(i)$ modulo 2, $i=0, \ldots, 2^{25}-2$, (Step 4) creating a Gold sequence $Z(i)$, where $i=0, \ldots, 2^{25}-2$,
$Z(i)=1-2*z(i)$ (Step 5) creating two real scrambling codes $c1(i)$ and $c2(i)$, where $i=0, \ldots, 2^{25}-2$,
$c1(i)=Z(i)$
$c2(i)=Z((i+16777232)$ modulo $(2^{25}-1))$, (Step 6) creating a scrambling code $C(i)$, where $i=0, \ldots, 2^{25}-2$,
$C(i)=c1(i)*(1+j(-1)^i*c2(2*[i/2]))$.

In the above formula, [x] indicate the largest one of integers smaller than or equal to a value x.

The scrambling codes created in this method are assigned to the UEs by the UTRAN during assignment of the DPCHs, in order to distinguish the UEs from one another.

In the W-CDMA communication system, one frame is comprised of 38400 chips. Therefore, the scrambling code is used in a unit of 38400 chips, and this can be achieved by using part of the scrambling code. That is, a scrambling code for one DPCH is $C(i)$, where $i=0,1, \ldots, 38399$.

The DPCHs use scrambling codes starting from $C(0)$ at the start point of the frame. The respective DPCHs have different initial values n0,n1, . . . ,n23, so that different scrambling codes are assigned to the DPCHs.

The latest W-CDMA communication system uses OVSF (Orthogonal Variable Spreading Factor) codes for channel separation. The OVSF codes maintain an orthogonal property among different physical channels of the UEs, thereby to identify the channels assigned to the UEs. Further, in the downlink, the OVSF codes can have different rates by varying the length of the OVSF code, i.e., spreading factor (SF). In the uplink, the OVSF codes are used to distinguish the channels used by one UE. In an uplink synchronous transmission scheme (USTS) where the UEs use the same scrambling code, the OVSF codes are used to distinguish the channels of the UEs.

The latest W-CDMA communication system maintains the time-asynchronous property by giving different time offsets to the DPCHs. This is because the downlink DPCH (DL DPCH) has a control part at its head. That is, the control parts of the downlink DPCHs are transmitted at a different time so as to resolve a power problem that may occur when the control parts are simultaneously transmitted. In addition, the uplink DPCH (UL DPCH) also has frame ends, that arrive at the Node B at different times so as to minimize any influence on the processing speed of the UTRAN.

FIG. 2 illustrates the timing relationship between the downlink DPCH and the uplink DPCH in the W-CDMA communication system. An asynchronous transmission scheme for the downlink DPCH and the uplink DPCH will be described below with reference to FIG. 2.

Referring to FIG. 2, one 10-ms frame is comprised of 15 slots, and each slot is comprised of 2560 chips. In FIG. 2, reference numeral 201 indicates a common pilot channel (CPICH), reference numeral 203 indicates a primary common control physical channel (P-CCPCH), reference numeral 205 indicates a frame in a slot unit, reference numerals 207 and 209 indicate downlink DPCHs, and reference numerals 208 and 210 indicate uplink DPCHs associated respectively with the downlink DPCHs 207 and 209. The CPICH 201 and the P-CCPCH 203 undergo frame synchronization, and are used as reference channels for other channels.

As illustrated in FIG. 2, the downlink DPCHs 207 and 209 are transmitted with time offsets $\tau_{DPCH,n}$ and $\tau_{DPCH,n+1}$ from the P-CCPCH 203, respectively. As stated above, the DPCHs are given the different time offsets $\tau_{DPCH}$. For example, each DPCH is given one of 0, 256, 2*256, . . . , 148*256 and 149*256-chip offsets.

After a lapse of $T_o$ time upon receiving the downlink DPCHs 207 and 209 transmitted with the time offsets $\tau_{DPCH,n}$ and $\tau_{DPCH,n+1}$ to the P-CCPCH 203, the UE transmits the associated uplink DPCHs 208 and 210. Therefore, the uplink DPCHs 208 and 210 are also synchronized with each other. Due to a distance difference between the UTRAN and the respective UEs, the UTRAN may not receive the uplink DPCH exactly the $T_o$ time after transmitting the downlink DPCH associated with the uplink DPCH. Therefore, the UTRAN measures a propagation delay time to the UE in the process of transmitting a random access channel (RACH) in order to measure a distance from the UE, and uses this value for initial synchronization. That is, the UTRAN uses the propagation delay time in predicting an expected uplink DPCH reception time after transmission of the downlink DPCH.

An uplink synchronous transmission scheme (USTS) assigns a single scrambling code to several UEs. The USTS is designed to synchronize the uplink DPCHs when the UTRAN receives the uplink DPCHs transmitted from the UEs. By using the USTS, the UTRAN can assign the same single scrambling code to the synchronized UEs. Therefore, the W-CDMA communication system employing the USTS can reduce the number of scrambling codes used in the cell, contributing to a reduction in interference between UE signals. When the UEs employing the USTS use the same scrambling code, the UTRAN can identify the UEs using channelization codes, i.e., the OVSF orthogonal codes provided from the RNC. In the USTS, the UTRAN synchronizes the uplink DPCHs of at least 2 UEs with each other, and then assigns the same scrambling code to the synchronized UEs. Further, the UTRAN assigns the different channelization codes (or OVSF codes) to the uplink DPCHs of the UEs assigned the same scrambling code, thereby to identify the received synchronized uplink DPCHs.

The USTS controls a sync time of the signal through the following two processes.

(1) Initial Synchronization Process

Upon receipt of a signal from the UE over the RACH, the UTRAN measures a difference between a predetermined reference time and a reception time of the signal received over the RACH, i.e., measures a delay time of the RACH signal. The UTRAN transmits the time difference to the UE over a forward access channel (FACH). Upon receipt of the time difference over the FACH, the UE aligns (or adjusts) a transmission time using the received time difference.

(2) Tracking Process

The UTRAN periodically transmits a time alignment bit to the UE through a comparison of the reception time of the UE signal and the reference time. If the time alignment bit is '1', the UE shifts the transmission time by ⅛ chip ahead. However, if the time alignment bit is '0', the UE shifts the transmission time by ⅛ chip behind. The time alignment bit is transmitted once every two frames using a transmit power control (TPC) bit in the control channel.

In the USTS where several UEs use the same single scrambling code, the UEs using the same scrambling code must be inevitably synchronized with one another. That is, when the UTRAN receives the DPCHs transmitted from several UEs, the received DPCHs must be subjected to both slot synchronization and frame synchronization. The frame synchronization is to minimize interference among the UEs using the same scrambling code, while slot synchronization is to distinguish the UEs using the same scrambling code by using the OVSF codes. The Initial Synchronization Process is a process for acquiring the frame synchronization and the slot synchronization.

As described above, the respective downlink DPCHs have a unique time offset $\tau_{DPCH,n}$. Therefore, the uplink DPCHs are not synchronized with one another. In the Initial Synchronization Process, the mis-synchronization among the uplink DPCHs must be aligned to acquire synchronization. Therefore, there is a demand for a concrete method for resolving the channel mis-synchronization problem in the Initial Synchronization Process.

SUMMARY OF THE INVENTION

It is, therefore, an object of the present invention to provide an apparatus and method for performing synchronization in CDMA communication system employing a USTS.

It is another object of the present invention to provide an apparatus and method for acquiring frame synchronization and slot synchronization of uplink DPCHs from UEs employing a USTS in a CDMA communication system.

To achieve the above and other objects, there is provided a method for synchronizing a scrambling code in a CDMA communication system including a UTRAN (UMTS Terrestrial Radio Access Network) and a plurality of user equipments (UEs), using orthogonal codes for identifying the UEs and a single scrambling code for identifying the UTRAN by the UEs, and employing an uplink synchronous transmission scheme (USTS) where the UEs synchronize frames of uplink dedicated physical channels (DPCHs) using the single scrambling code. The UEs receive a reference signal including reference time information provided from the UTRAN and transmit a random access channel (RACH) signal based on the reference time. The UTRAN receives the random access channels signal from the UEs to measure a propagation delay time (PD) of each random access channel signal from the UEs, and transmits a transmission time adjustment value calculated using the measured propagation delay time and a time offset $\tau_{DPCH,n}$ between a transmission time point of the reference signal and a transmission time point of a downlink DPCH. Each UE determines a transmission time of the uplink DPCH by receiving the transmission time adjustment value, and scrambles a message with the orthogonal code and a scrambling code generated at the reference time, at the transmission time so determined as to transmit the message over the uplink DPCH.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

An embodiment of the present invention discloses a method for synchronization of uplink DPCHs from UEs using the same scrambling code in a CDMA communication system employing the USTS (Uplink Synchronous Transmission Scheme). A process necessary for initial synchronization of the uplink DPCH can be divided into two processes: one is a process for synchronization in a slot unit or 256*m-chip unit, and another is a scrambling code synchronization process.

First, the synchronization process in a slot unit or 256*m-chip unit will be described.

Figure 1:
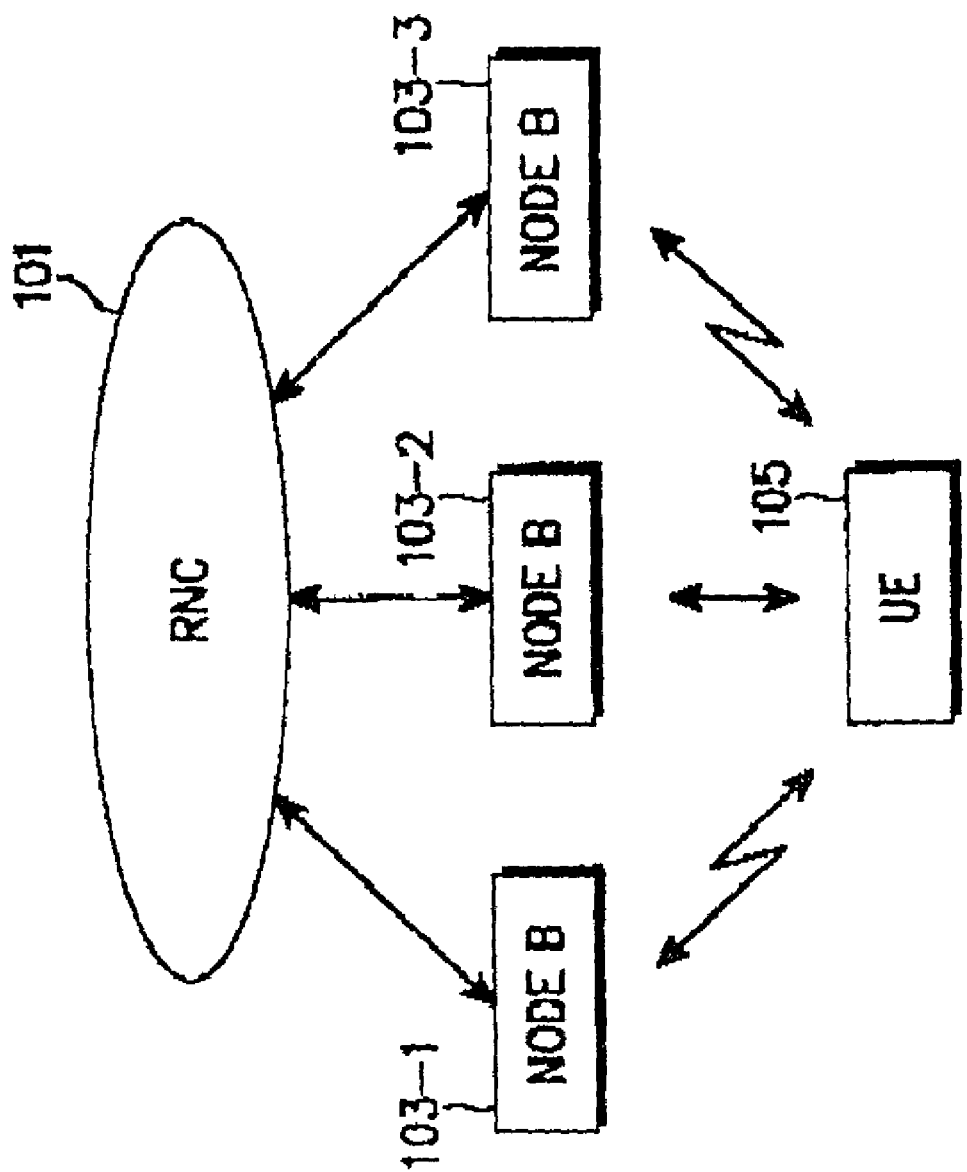
FIG. 1 is a diagram illustrating architecture of a W-CDMA communication system.
Figure 2:
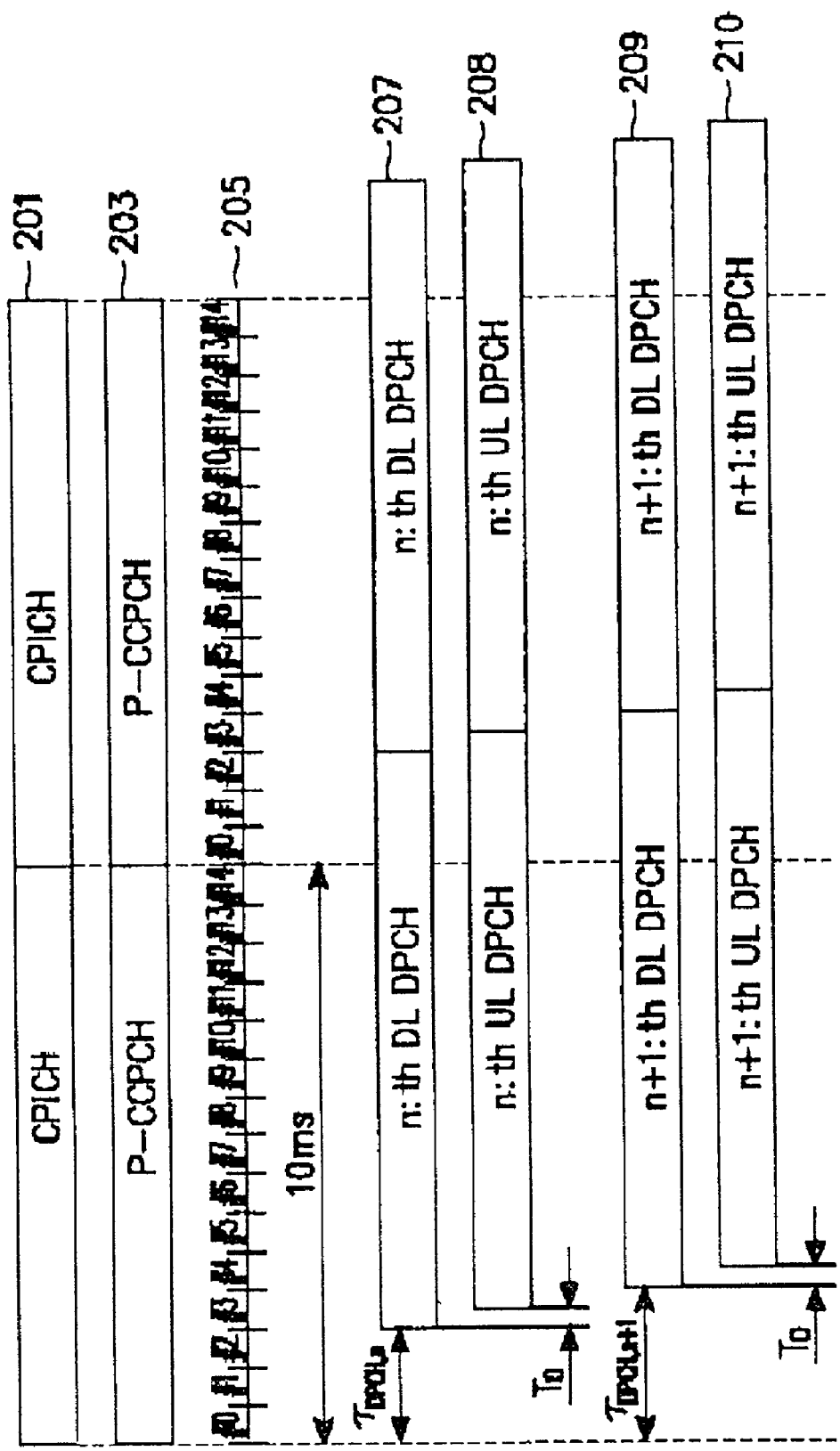
FIG. 2 is a diagram illustrating the timing relationship between a downlink DPCH and an uplink DPCH in the W-CDMA communication system.
Figure 3:
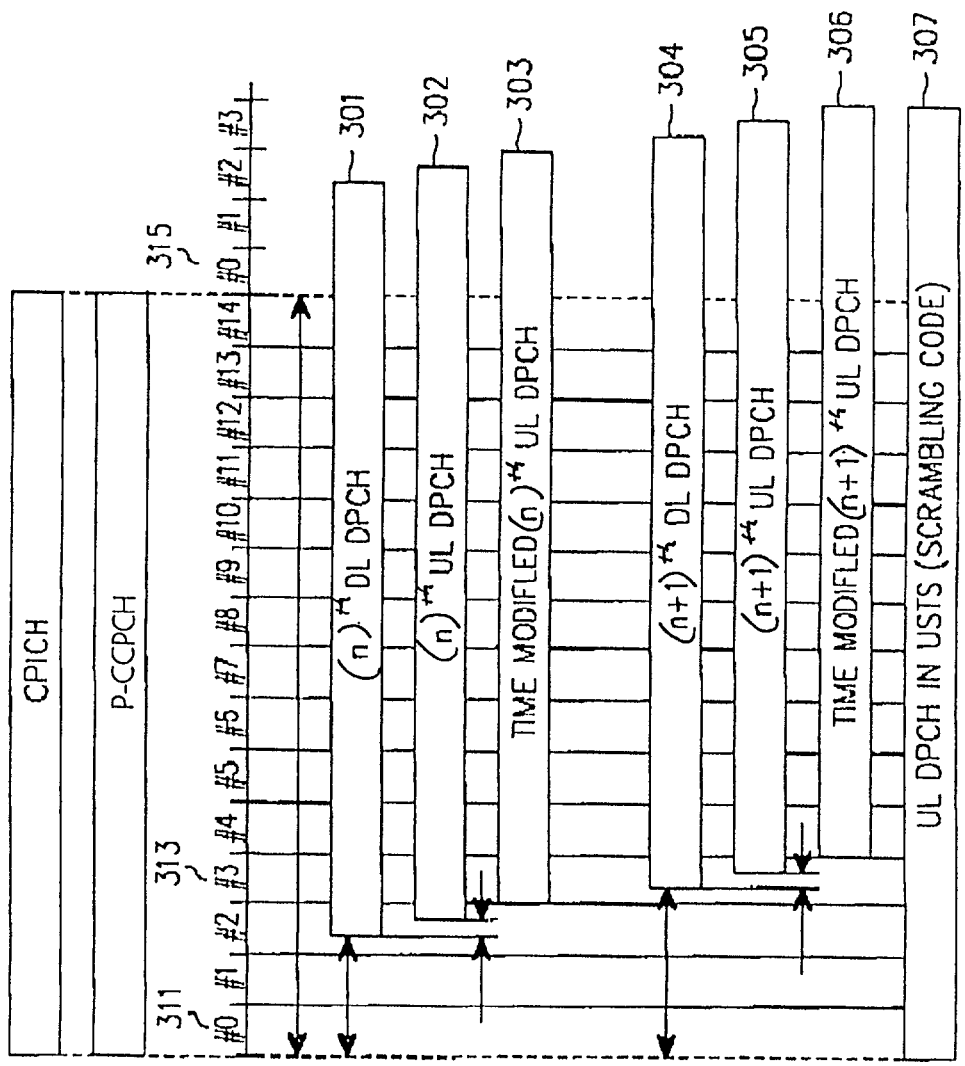
FIG. 3 is a diagram illustrating the timing relationship when synchronization is performed by a USTS according to an embodiment of the present invention.

FIG. 3 illustrates the timing relationship when synchronization is performed by a USTS according to an embodiment of the present invention.

Referring to FIG. 3, reference numeral 301 indicates a transmission time of the downlink DPCH (DL DPCH) of an $n^{th}$ UE out of the UEs sharing a given scrambling code. The $n^{th}$ UE's downlink DPCH 301 is transmitted after delay of a time offset $\tau_{DPCH,n}$ from the transmission time of the CPICH or the P-CCPCH. The respective DPCHs have a different transmission time. Reference numeral 302 indicates a transmission time of the uplink DPCH (UL DPCH) of the $n^{th}$ UE. The UE transmits the uplink DPCH at $T_o$ time after receiving the downlink DPCH. Therefore, the UEs have the different transmission time of the uplink DPCHs. The USTS must synchronize the uplink DPCHs with one another. Therefore, when it is desired to perform communication using the USTS, a process for synchronizing the uplink DPCHs is required. The embodiment of the present invention discloses a method for synchronizing the uplink DPCHs of the UEs using the same scrambling code in the USTS.

(Step 1) Measurement of Propagation Delay (PD)

Upon receipt of an RACH transmitted from the UE, the UTRAN measures a propagation delay (PD) value of the RACH signal. The measured PD value is used when the UTRAN assigns the DPCH.

(Step 2) Calculation of $K=(\tau_{DPCH,n}+T_o+2*PD)$ mod 2560

The UTRAN calculates the sum K of a time offset $\tau_{DPCH,n}$ of a given downlink DPCH, a constant $T_o$, and a value determined by multiplying the PD value measured in Step 1 by 2. Here, the time offset $\tau_{DPCH,n}$ indicates a delay time between the P-CCPCH and the downlink DPCH, and the constant $T_o$ indicates a delay time between the downlink DPCH and the uplink DPCH of the UE. Further, the PD value indicates a propagation delay value, wherein '2560' indicates the number of chips constituting one slot. The reason for multiplying the PD value by 2 is because the propagation delay occurs not only in the uplink but also in the downlink. In addition, performing a modulo 2560 operation is to express the K value in a slot unit.

(Step 3) Transmission of L=2560−K to UE

The UTRAN calculates a value L using the value K calculated based on the PD value, and then, transmits the calculated value L to the UE. Upon receipt of the value L, the UE transmits the uplink DPCH, after the delay of the time $T_o$ from a reception time of the downlink DPCH and after the time L. Herein, please note that L is defined above as L=2560−K.

In the foregoing description, the UTRAN calculates the value L and transmits the calculated value L to the UE. Alternatively, however, the UTRAN can also transmit the value K to the UE. In the case where the UTRAN transmits the value K to the UE, the UE transmits the uplink DPCH, $T_o$−K time after receiving the downlink DPCH. However, in the case where the UTRAN transmits the value L to the UE, the UE transmits the uplink DPCH, $T_o$+K after receipt of the downlink DPCH. In Step 2 and Step 3, the UEs are subjected to synchronization in a unit of slot (=2560 chips). Although the synchronization is performed in a unit of 2560-chip slot herein, it is also possible to perform the synchronization in a unit of a multiple of 256 chips in the light of the property of the OVSF codes. That is, the synchronization is performed in a unit of 256*m chips. Performing synchronization in a unit of 2560-chip slot is an example of performing synchronization in a unit of 256*m chips where m=10.

Here, the value 'm' can be either provided through a signaling message from an upper layer or previously determined. A process for performing synchronization in a unit of 256*m chips will be described below.

(Step 1) Measurement of Propagation Delay (PD)

Upon receipt of an RACH transmitted from the UE, the UTRAN measures the propagation delay value PD of the RACH. It is known that the measured PD value is used when the UTRAN assigns the DPCH. The PD value can be calculated in a chip unit. In this case, the PD value indicates a one-way propagation delay time between the UTRAN and the UE.

(Step 2) Calculation of $K=(\tau_{DPCH,n}+T_o+2*PD)$ mod 256*m

The UTRAN calculates the sum K of a time offset $\tau_{DPCH,n}$ of a given downlink DPCH, a constant $T_o$, and a value determined by multiplying the PD value measured in Step 1 by 2.

(Step 3) Transmission of L=256*m−K to UE

The UTRAN calculates a value L using the value K calculated based on the PD value, and then, transmits the calculated value L to the UE. Upon receipt of the value L, the UE transmits the uplink DPCH, after the delay of the time $T_o$ from a reception time of the downlink DPCH and after the time L.

In Step 2, the time offset $\tau_{DPCH,n}$ is defined as 256*K, and the value $T_o$ is defined as 256*4. Therefore, for m=1, the value K is equivalent to a remainder determined by dividing 2*PD by 256 (i.e., 2*PD mod 256). In Step 3, the UTRAN can transmit the value K instead of the value L to the UE. In this case, the UE can calculate the value L from the value K, or use the intact value K.

Upon receipt of the value K or the value L transmitted from the UTRAN, the UE may also transmit the uplink DPCH, at time $T_o$−K after the reception time of the downlink DPCH using the value K, rather than transmitting the uplink DPCH after the delay of the time $T_o$ from the receipt time of the downlink DPCH and after the time L. Therefore, upon receipt of the value L or the value K, the UE transmits the uplink DPCH after calculating the value K or the value L in the method stated above.

The UTRAN may also transmit the PD value to the UE instead of transmitting the value L or the value K. In this case, upon receipt of the PD value transmitted from the UTRAN, the UE can use the received PD value, considering the time offset $\tau_{DPCH,n}$ and the value $T_o$. For example, upon receipt of the PD value, the UE can transmit the uplink DPCH using a value (Toff) which is determined by subtracting the PD value from the value $T_o$ after receiving the downlink DPCH. That is, the UE can transmit the uplink DPCH after the time Toff from a frame start point of the downlink DPCH. Alternatively, the UE can also transmit the uplink DPCH after the further delay of a time determined by adding a common delay time given in the system to the time Toff. In addition, the UE can calculate the value K and the value L using the PD value transmitted from the UTRAN, and transmit the uplink DPCH after a time Toff1 from the frame start point of the downlink DPCH, the value Toff1 being calculated by subtracting the calculated value L from the value $T_o$.

Next, the scrambling code synchronization process will be described.

Reference numeral 303 of FIG. 3 indicates a transmission time of the uplink DPCH from an $n^{th}$ UE out of the synchronized UEs. Therefore, when received at the UTRAN, the $n^{th}$ UE's uplink DPCH is slot-synchronized. A sync error caused by mobility of the UE during a time between transmission of the RACH signal and transmission of the DPCH can be modified by another method. For example, such a sync error can be corrected through the tracking process stated above.

Reference numerals 304, 305 and 306 of FIG. 3 indicate a transmission time of an $(n+1)^{th}$ UE having a different time offset $\tau_{DPCH,n+1}$. The $(n+1)^{th}$ UE also undergoes the slot synchronization in the same method as used by the $n^{th}$ UE.

In this method, it is possible to maintain the slot synchronization among the UEs sharing one scrambling code. Even though the slot synchronization is acquired, frame synchronization may not be acquired according to the time offset $\tau_{DPCH,n}$. In order for the UEs in a USTS group to use one scrambling code, it is necessary to time-align (or synchronize) the scrambling codes used by the UEs, and in order to synchronize the scrambling codes, it is necessary to acquire the frame synchronization.

Reference numeral 307 of FIG. 3 indicates a method for acquiring frame synchronization in order to synchronize the scrambling codes. In order for the UEs belonging to the USTS group using one scrambling code to acquire synchronization of the scrambling codes during a reception time of the UTRAN, a scrambling code synchronization operation is required. Here, "synchronization of the scrambling codes" means that the scrambling codes start at the same time. That is, synchronization of the scrambling codes means that a start point C(0) of the scrambling codes C(i) where i=0, 1, . . . ,38399, is time aligned.

It is not possible to acquire synchronization of the scrambling codes only by the process of performing synchronization in a unit of slot or in a unit of 256*m chips. Therefore, for the synchronization of the scrambling codes, it is necessary to time-align the scrambling codes to a common (or reference) time. FIG. 3 shows that for the synchronization of the scrambling codes, the frame start point of the CPICH or the P-CCPCH is used as the common time as represented by reference numeral 307.

When the frame start point of the CPICH or the P-CCPCH is used as the common time, the UEs in the USTS group start creating the scrambling codes in sync with the frame start point of the CPICH or the P-CCPCH. For example, the $n^{th}$ UE starts frame synchronization of the uplink DPCH 303 at a $4^{th}$ slot Slot#3. In this case, although the nth UE's frame start point is the $4^{th}$ slot (i.e., Slot#3, reference numeral 313), a start point of the scrambling code is time-aligned to the first slot (Slot#0) (reference numeral 311). That is, the start point of the scrambling code is not time-aligned with the frame start point of the uplink DPCH. In the conventional method, the start point of the scrambling code is time-aligned with the frame start point of the uplink DPCH.

However, the embodiment of the present invention time-aligns the start point of the scrambling code for the USTS by separating the frame start point of the uplink DPCH and the start point of the scrambling code.

The scrambling code synchronization process will be described below with reference to the $n^{th}$ UE.

According to the prior art, since the frame start point of the uplink DPCH is time-aligned with the start point of the scrambling code, the $n^{th}$ UE uses the scrambling code which starts from C(0) at the $4^{th}$ slot (Slot#3) of the uplink DPCH 303. In the embodiment of the present invention, however, the frame start point of the P-CCPCH is used as the common time. Therefore, in order to use the scrambling code starting from C(0) at the $1^{st}$ slot (Slot#0) 311, the $n^{th}$ UE must know a scrambling code generated at the frame start point of the uplink DPCH which starts at the $4^{th}$ slot (Slot#3) 313. Since the scrambling code is comprised of 2560 chips per slot, the UE whose uplink DPCH frame starts from (Slot#3) 313 uses a scrambling code starting from C(3*2560), and uses a scrambling code restarting from C(0) at the (Slot#0) 311. That is, the UE changes the scrambling code C(i) (where i=0,1, . . . ,38399) to D(i)=C((i+3*2560) modulo 38400) (where i=0,1, . . . ,38399), and starts the scrambling code D(i) from D(0) beginning at the frame start point (Slot#3) 313.

Therefore, each UE calculates the frame start point of the uplink DPCH based on the time offset $\tau_{DPCH,n}$ and the value L, changes the scrambling code to D(i)=C((i+m*2560) modulo 38400) (where i=0,1, . . . ,38399) for the frame start point corresponding to slot #m, and uses the scrambling code starting from D(0) beginning at the frame start point.

In the foregoing description, the common time is defined as the frame start point of the P-CCPCH. However, the common time can also be determined by the UTRAN and transmitted to the UE employing the USTS.

As another example of determining the common time, the frame start point of the uplink DPCH for the UE first assigned for the USTS using a given scrambling code is defined as the common time. Referring to FIG. 3, only the $n^{th}$ UE and the $(n+1)^{th}$ UE use the given scrambling code. When the $n^{th}$ UE is first assigned the channel, the common time can be defined as the frame start point of the $n^{th}$ UE, i.e., Slot#3 313, defined as the scrambling code start point. Therefore, the UTRAN transmits to the $(n+1)^{th}$ UE this information indicating that Slot#3 is the common start time, so that the $(n+1)^{th}$ UE acquires synchronization.

This embodiment discloses the scrambling synchronization method based on the slot synchronization.

When synchronization is performed in a unit of 256*m chips, the scrambling synchronization method is as follows. In the 256*m-chip unit synchronization process, the UE determines the transmission time of the uplink DPCH using the value L, the value K or the PD value. Since the UE and the UTRAN share the time offset value $\tau_{DPCH,n}$ and the value $T_o$, they can know how the synchronization was performed in the 256*m-chip unit, depending on the value L, the value K and the PD value. Therefore, it is possible to search the scrambling start point based on the PD value or the value L.

For example, if (1) $\tau_{DPCH,n}$=256*25 chips, (2) $T_o$=256*4 chips, (3) PD=1000 chips and (4) m=1, then the value L is calculated by L=256−[($\tau_{DPCH,n}$+$T_o$+2PD) mod 256]=48. It is assumed that the 256*m-chip unit synchronization method is performed using the value L. Even when the value K or the PD value is used, the scrambling synchronization can be performed by modifying the method described below.

The UE uses the value L for the 256*m-chip unit synchronization. That is, the UE starts transmitting the uplink DPCH frame after the delay of the $T_o+L$ value from the frame start point of the received downlink DPCH. Further, the UE determines a scrambling code offset using the frame start point of the P-CCPCH received for scrambling code synchronization and also using the PD value received from the UTRAN. That is, the UE changes the scrambling code to $D(i)=C((i+\text{offset}) \text{ modulo } 38400)$ (where i=0,1, . . . ,38399), and uses the scrambling code starting from D(0) beginning at the frame start point. The offset value is calculated by $$\text{offset}=\tau_{DPCH,n}+T_o+2*PD+L$$

The UE can either determine the offset value through the calculation or be provided with the offset value from the UTRAN. When the scrambling code synchronization method is used, the scrambling codes of the UEs using the USTS can arrive at the UTRAN at the same position. This method corresponds to the case where the P-CCPCH is set as the common time.

It is also possible to time-align the scrambling codes to the first assigned UE. In this case, for alignment of the scrambling codes, an information signal from the upper layer is additionally required. The UTRAN can directly transmit to each UE for the synchronization. That is, the UTRAN can transmit the value L for the 256*m synchronization, and transmit the synchronization information of a reference UE for the scrambling code synchronization. As one example, the UTRAN can also transmit the offset value.

Figure 4:
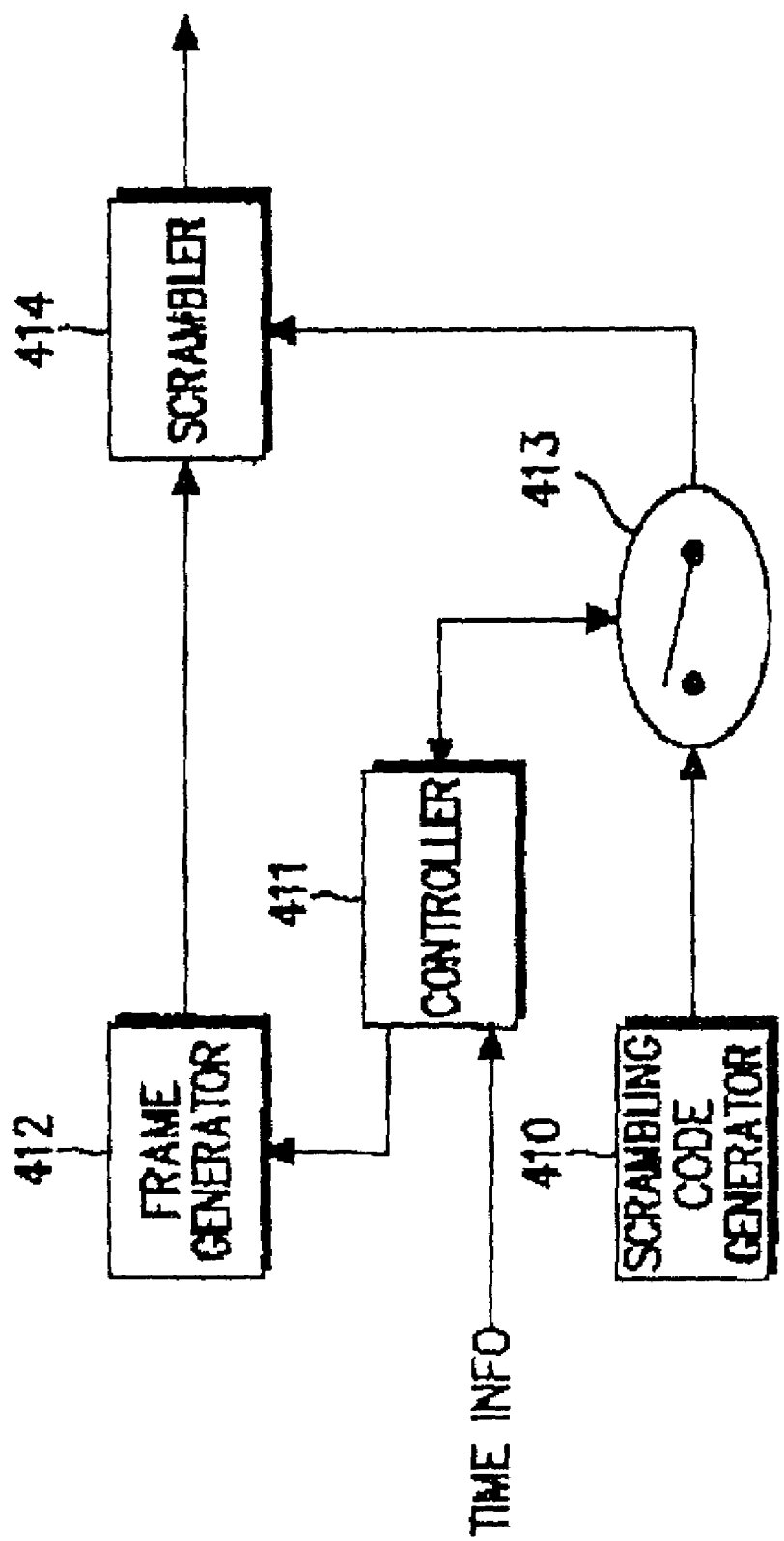
FIG. 4 is a diagram illustrating a structure of a scrambling code synchronization apparatus for a UE according to an embodiment of the present invention.

FIG. 4 illustrates a structure of a scrambling code synchronization apparatus for the UE according to an embodiment of the present invention. Referring to FIG. 4, a scrambling code generator 410 creates a scrambling code in sync with a given common time. That is, when the frame start time is defined as the common time, the scrambling code generator 410 creates a scrambling code starting from C(0) or the scrambling code offset beginning at the first slot Slot#0 of the P-CCPCH. Alternatively, when the frame start point of the first UE is set as the common time, the scrambling code generator 410 creates a scrambling code starting from C(0) beginning at the slot which becomes the frame start point of the first UE.

A controller 411 receives time information about the frame start point from the upper layer. The frame start point is calculated based on the time offset value $\tau_{DPCH,n}$ and the PD value. For example, in FIG. 3, the frame start point of the UE transmitting the $n^{th}$ DPCH becomes Slot#3, and the frame start point of the UE transmitting the $(n+1)^{th}$ DPCH becomes Slot#4. The controller 411 transmits the frame start point information to a frame generator 412 and a switch 413 based on the time information, so as to control the UE to start transmitting the uplink DPCH. Upon receipt of the frame start point information from the controller 411, the frame generator 412 starts creating the frame at a given time and transmits the created frame to a scrambler 414. Upon receipt of the frame start point information from the controller 411, the switch 413 transmits the scrambling code created by the scrambling code generator 410 to the scrambler 414. The scrambler 414 spreads the frame received from the frame generator 412 using the scrambling code received from the scrambling code generator 410.

In operation of the scrambling code synchronization apparatus, the controller 411 drives the frame generator 412 at the frame start point in order to create the data frame to be transmitted over the DPCH. Further, the controller 411 turns ON the switch 413 at the frame start point so as to provide the scrambling code created by the scrambling code generator 410 to the scrambler 414. The scrambling code generator 410 can create the scrambling code in sync with the frame start point of the CPICH or the P-CCPCH. In this case, since the scrambling code is provided to the scrambler 414 beginning at the frame start point of the DPCH, the scrambling code created at the frame start point of the DPCH may not be identical to C(0). That is, when the frame start point of the DPCH starts at the $3^{rd}$ slot, the DPCH data frame is spread with the scrambling code created at the $3^{rd}$ slot.

In addition, if the scrambling code generator 410 generates the scrambling code in sync with the frame start point of the first UE in the USTS group, to which the DPCH is assigned, instead of creating the scrambling code at the frame start point of the CPICH or the P-CCPCH, the controller 411 controls a time point for creating the scrambling code. The succeeding operation is identical to that described above.

By using the scrambling code synchronization apparatus, it is possible to transmit the frame in sync with a given time offset by using the scrambling code time-aligned with the common time during transmission of uplink DPCH of the USTS.

The scrambling code synchronization method according to the present invention acquires slot synchronization of the UEs in the USTS group and aligns the start points of the scrambling codes. Therefore, it is possible to reduce interference thanks to the time alignment of the scrambling codes and identify information from the UEs through the channelization code (e.g., OVSF code) by slot synchronization.

As described above, when the CDMA communication system employs the USTS in which several UEs use a single scrambling code, it is possible to embody slot and frame synchronizations among the UEs using the same single scrambling code. Since the downlink DPCHs have a different delay time, synchronization among the uplink DPCHs is not acquired. Thus, in the initial synchronization process, the mis-synchronization among the uplink DPCHs is adjusted to acquire the synchronization.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for synchronizing a scrambling code in a CDMA (Code Division Multiple Access) communication system including a UTRAN (UMTS (Universal Mobile Telecommunications System) Terrestrial Radio Access Network) and a plurality of user equipments (UEs), using orthogonal codes for identifying the UEs and a single up-link scrambling code for the UEs to identify the UTRAN, and employing an uplink synchronous transmission scheme (USTS) where the UEs synchronize frames of uplink physical channels using the single scrambling code, wherein the UEs receive a signal providing system timing provided from the UTRAN and transmit a random access channel (RACH) signal based on the system timing, comprising the steps of:

receiving, in the UTRAN, the random access channel signal from a UE to measure a propagation delay time (PD) of the UE, and transmitting a transmission time adjustment value calculated using the measured propagation delay time and a time offset $\tau_{DPCH,n}$ between the system timing and a transmission time point of a downlink dedicated physical channel (DPCH); and determining, in the UE, a transmission time of the uplink physical channel signal by receiving the transmission time adjustment value, and scrambling a frame data with an orthogonal code and a scrambling code generated at a time being different from a generating time of the frame data with a scrambling code offset calculated from the transmission time adjustment value.

2. The method as claimed in claim 1, wherein the system timing is a starting timing of a common pilot channel (CPICH) signal.

3. The method as claimed in claim 1, wherein the system timing is a starting timing of a primary common control physical channel (P-CCPCH) signal.

4. The method as claimed in claim 1, wherein the transmission time adjustment value is calculated by:

$$\text{transmission time adjustment value} = (\tau_{DPCH,n} + T_o + 2*PD) \bmod 2560$$

where $T_o$ is a constant value.

5. The method as claimed in claim 1, wherein the transmission time adjustment value is calculated by:

$$\text{transmission time adjustment value} = 2560 - [(\tau_{DPCH,n} + T_o + 2*PD) \bmod 2560]$$

where $T_o$ is a constant value.

6. The method as claimed in claim 1, wherein the transmission time adjustment value is calculated by:

$$\text{transmission time adjustment value} = (\tau_{DPCH,n} + T_o + 2*PD) \bmod 256*m$$

where $T_o$ is a constant value, and $m=1,2,3,\ldots,10$.

7. The method as claimed in claim 1, wherein the transmission time adjustment value is calculated by:

$$\text{transmission time adjustment value} = (256*m) - [(\tau_{DPCH,n} + T_o + 2*PD) \bmod 256*m]$$

where $T_o$ is a constant value, and $m=1,2,3,\ldots,10$.

8. The method as claimed in claim 1, wherein the transmission time adjustment value is calculated by subtracting the propagation delay time from a constant value $T_o$.

9. The method as claimed in claim 1, wherein the scrambling code offset is calculated by:

$$\text{offset} = \tau_{DPCH,n} + T_o + 2PD + L$$

where L indicates the transmission time adjustment value.

10. A method for synchronizing a scrambling code in a UE of a CDMA communication system including a UTRAN and a plurality of UEs, using orthogonal codes for identifying the UEs and a single uplink scrambling code for the UEs to identify the UTRAN and employing an uplink synchronous transmission scheme (USTS) where the UEs synchronize frames of uplink physical channels using the single scrambling code, wherein the UEs receive a signal providing system timing provided from the UTRAN and transmit a random access channel (RACH) signal based on the system timing, comprising the steps of:

determining a transmission time upon receipt of a transmission time adjustment value for slot synchronization from the UTRAN in response to the transmitted RACH signal;

creating a scrambling code at the system timing;

creating a data frame at the determined transmission time; and scrambling, at the determined transmission time, the data frame with the scrambling code generated at a time being different from a transmission time of the frame data with a scrambling code offset calculated from the transmission time adjustment value.

11. An apparatus for synchronizing a scrambling code in a UE of a CDMA communication system including a UTRAN and a plurality of UEs, using orthogonal codes for identifying the UEs and a single uplink scrambling code for the UEs to identify the UTRAN, and employing an uplink synchronous transmission scheme (USTS) where the UEs synchronize frames of uplink physical channels using the single scrambling code, wherein the UEs receive a signal providing system timing provided from the UTRAN and transmit a random access channel (RACH) signal based on the system timing, the apparatus comprising:

a controller for determining a transmission time upon receipt of a transmission time adjustment value for slot synchronization from the UTRAN in response to the transmitted RACH signal;

a scrambling code generator for creating a scrambling code at the system timing;

a frame generator for creating a data frame at the determined transmission time; and a scrambler for scrambling, at the transmission time determined by the controller, the data frame with the scrambling code generated at a time being different from a transmission time of the frame data with a scrambling code offset calculated from the transmission time adjustment value at the system time.

12. The apparatus as claimed in claim 11, wherein the system timing is a starting timing of a common pilot channel (CPICH) signal.

13. The apparatus as claimed in claim 11, wherein the system timing is a starting timing of a primary common control physical channel (P-CCPCH) signal.

14. The apparatus as claimed in claim 11, wherein the transmission time adjustment value is calculated by:

$$\text{transmission time adjustment value} = (\tau_{DPCH,n} + T_o + 2*PD) \bmod 2560$$

where $T_o$ is a constant value.

15. The apparatus as claimed in claim 11, wherein the transmission time adjustment value is calculated by:

$$\text{transmission time adjustment value} = 2560 - [(\tau_{DPCH,n} + T_o + 2*PD) \bmod 2560]$$

where $T_o$ is a constant value.

16. The apparatus as claimed in claim 11, wherein the transmission time adjustment value is calculated by:

$$\text{transmission time adjustment value} = (\tau_{DPCH,n} + T_o + 2*PD) \bmod 256*m$$

where $T_o$ is a constant value, and $m=1,2,3,\ldots,10$.

17. The apparatus as claimed in claim 11, wherein the transmission time adjustment value is calculated by:

$$\text{transmission time adjustment value} = (256*m) - [(\tau_{DPCH,n} + T_o + 2*PD) \bmod 256*m]$$

where $T_o$ is a constant value, and $m=1,2,3,\ldots,10$.

18. The apparatus as claimed in claim 11, wherein the transmission time adjustment value from a constant $T_o$ is calculated by subtracting the propagation delay time from a constant value $T_o$.

19. The apparatus as claimed in claim 11, wherein the scrambling code for scrambling the message is delayed by a given scrambling code offset from the scrambling code generated at the system time.

20. The apparatus as claimed in claim 19, wherein the offset is calculated by:

$$\text{offset} = \tau_{DPCH,n} + T_o + 2PD + L$$

where L indicates the transmission time adjustment value.

21. A method for data transmission in a communication system, the method comprising:
- receiving, at a Network, a Random Access Channel (RACH) transmitted from a User Equipment (UE);
- calculating a transmission time adjustment value for the UE;
- transmitting the transmission time adjustment to the UE;
- receiving, at the UE, the transmission time adjustment value;
- calculating a starting timing of an uplink frame;
- generating an orthogonal code for spreading the uplink frame at the starting timing of the uplink frame;
- generating a scrambling code for scrambling code for scrambling the uplink frame at a predetermined timing; and
- transmitting the uplink frame scrambled and spread by the scrambling code and the orthogonal code with reference to the starting timing of the uplink frame.

22. The method as claimed in claim 21, wherein the predetermined timing for the scrambling code is a starting timing of a common pilot channel (CPICH).

23. The method as claimed in claim 21, wherein the starting timing of the uplink frame is synchronized with a starting timing of a slot time of a common pilot channel (CPICH).

24. The method as claimed in claim 23, wherein the transmission time adjustment value can be adjusted as much as a propagation delay of an uplink and downlink.

* * * * *